US012716802B2

(12) United States Patent
Alnumay et al.

(10) Patent No.: US 12,716,802 B2
(45) Date of Patent: Aug. 25, 2026

(54) DETECTING PASSING VALVES

(71) Applicant: Saudi Arabian Oil Company, Dhahran (SA)

(72) Inventors: Yazeed Alnumay, Thuwal (SA); Ali Alrasheed, Thuwal (SA); Amjad Felemban, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 449 days.

(21) Appl. No.: 18/366,302

(22) Filed: Aug. 7, 2023

(65) Prior Publication Data

US 2025/0052638 A1 Feb. 13, 2025

(51) Int. Cl.
*G05B 13/02* (2006.01)
*G01M 3/24* (2006.01)

(52) U.S. Cl.
CPC ............. *G01M 3/24* (2013.01); *G05B 13/027* (2013.01)

(58) Field of Classification Search
CPC ............................... G01M 3/24; G05B 13/027
See application file for complete search history.

(56) References Cited

U.S. PATENT DOCUMENTS 5,568,825 A * 10/1996 Faulk ...................... E03B 7/071 137/552
5,995,910 A * 11/1999 Discenzo ............... G01H 1/003 702/56
9,091,613 B2 7/2015 Baliga
9,759,628 B2 9/2017 Mian et al.
9,810,598 B2 11/2017 Hale
9,939,344 B2 4/2018 Bracken et al.
10,994,385 B2 5/2021 Kato et al.
11,020,859 B2 6/2021 Patrick et al.
11,256,236 B2 2/2022 Nakaya et al.
11,892,437 B2 2/2024 Armitage
2002/0029883 A1* 3/2002 Vinegar ................ E21B 34/066 166/250.03
2004/0128034 A1* 7/2004 Lenker ................. G05D 7/0635 700/282

(Continued)

FOREIGN PATENT DOCUMENTS

CN 105546361 5/2016
KR 20200031251 3/2020
WO WO 2023144040 A1 8/2023

OTHER PUBLICATIONS

Tawfik, Ahmed. “Air vessel sizing approach for pipeline protection using artificial neural networks.” Journal of Engineering and Applied Science 70.1 (2023): 34. (Year: 2023).*

(Continued)

*Primary Examiner* — Christopher E. Everett
(74) *Attorney, Agent, or Firm* — Fish & Richardson P.C.

(57) ABSTRACT

This disclosure describes systems and methods for detecting passing valves. A method includes measuring vibrational data with a sensor coupled to a pipe adjacent to a valve; generating a spectrogram representing a time variation of frequencies of the vibrational data; detecting that the valve is a passing valve by classifying the spectrogram as including frequencies representative of a passing valve, the classifying being based on a trained convolutional neural network; and in response to detecting the passing valve, performing a corrective action to resolve the passing valve.

20 Claims, 7 Drawing Sheets

(56) References Cited

U.S. PATENT DOCUMENTS

| | | | | |
|---|---|---|---|---|
| 2005/0072239 | A1* | 4/2005 | Longsdorf | G05B 23/027 702/56 |
| 2006/0174707 | A1* | 8/2006 | Zhang | G01N 29/4418 700/282 |
| 2014/0121999 | A1 | 5/2014 | Bracken et al. | |
| 2015/0127738 | A1* | 5/2015 | Thompson | H04W 4/70 709/204 |
| 2017/0307464 | A1 | 10/2017 | Hasselbeck et al. | |
| 2019/0339684 | A1 | 11/2019 | Cella et al. | |
| 2019/0340914 | A1 | 11/2019 | Israelsen | |
| 2020/0149655 | A1 | 5/2020 | Keely et al. | |
| 2022/0260985 | A1 | 8/2022 | Gabaldon et al. | |
| 2022/0334024 | A1 | 10/2022 | Shinohara et al. | |
| 2023/0175914 | A1 | 6/2023 | Diven et al. | |
| 2023/0176557 | A1* | 6/2023 | Cella | G05B 13/048 700/117 |
| 2023/0184620 | A1* | 6/2023 | Batany | G06N 20/00 702/51 |
| 2023/0194376 | A1 | 6/2023 | O'Driscoll et al. | |

OTHER PUBLICATIONS

Tawfik, Ahmed M. "Hydraulic solutions of pipeline systems using artificial neural networks." Ain Shams Engineering Journal 14.3 (2023): 101896 (Year: 2023).*

International Search Report and Written Opinioin in International Appln. No. PCT/US2025/010566, mailed on Apr. 28, 2025, 14 pages.

Emerson [online], "AMS 2140 Machinery Health Analyzer," retrieved on Jun. 14, 2024, retrieved from URL <https://www.emerson.com/en-us/catalog/ams-a2140>, 1 page.

Fluke.com [online], "Fluke 805 Vibration Meter," retrieved on Jun. 14, 2024, retrieved from URL <https://www.fluke.com/en-us/product/mechanical-maintenance/vibration-analysis/fluke-805>, 5 pages.

IMI Sensors, "Handheld Vibration Meter," Product Brochure, Model 687A02, 2021, 2 pages.

Li et al., "A novel acoustic emission detection module for leakage recognition in a gas pipeline valve," Process Safety and Environmental Protection, Oct. 2016, 105:32-40, 20 pages.

Midasvalvediagnostics.com [online], "AE Leak Detection Explained," retrieved on Jun. 5, 2024, retrieved from URL<https://midasvalvediagnostics.com/acoustic-emissions/ae-leak-detection-explained.php#:~:text=Leakages%20can%20be%20detected%20at,stable%20reading%20is%20then%20recorded>, 2 pages.

Phase IV [online], "Industrial Grade Wireless Motor Sensor—Vibration and Temperature Module," retrieved on Jun. 14, 2024, retrieved from URL <https://www.phaseivengr.com/product/sensors/temperature/high-temperature/wireless-vibration-temperature-modue/>, 2 pages.

Physicalacoustics.com [online], "VPAC™II—Through-Valve Loss Control Instrument," retrieved on Jun. 5, 2024, retrieved from URL<https://www.physicalacoustics.com/by-product/vpac-ii/>, 3 pages.

Prateepasen et al., "Smart portable noninvasive instrument for detection of internal air leakage of a valve using acoustic emission signals," Measurement, Oct. 2010, 44:378-384, 7 pages.

Quy et al., "Real-Time Leak Detection for a Gas Pipeline using a k-NN Classifier and Hybrid AE Features," Sensors, Jan. 2021, 21(2): 367, 14 pages.

Shen-Bin Zhu et al., "Convolutional neural networks-based valve internal leakage recognition model," Measurement, Apr. 2021, 1780:109395, 10 pages.

Shi et al., "Prediction Method of Ball Valve Internal Leakage Rate based on Acoustic Emission Technology," Flow Measurement and Instrumentation, Oct. 2021, 81:102036, 10 pages.

Thompson et al., "An experimental investigation into the detection of internal leakage of gases through valves by vibration analysis," Journal of Process Mechanical Engineering, Aug. 1997, 14 pages.

Yao et al., "Natural gas pipeline leak detection based on acoustic signal analysis and feature reconstruction," Applied Energy, Dec. 2023, 352: 121975, 15 pages.

Zhu et al., "Convolutional neural networks-based valve internal leakage recognition model," Measurement, Apr. 2021, 178: 109395, 10 pages.

* cited by examiner

DETECTING PASSING VALVES

TECHNICAL FIELD

The present disclosure relates to methods and systems for detecting passing valves.

BACKGROUND

Oil and gas plants include a multitude of pipes and valves to transport fluids throughout the plant. Normal operation of valves is an open position or a closed position. A passing valve, however, allows a portion of the fluid to pass the valve when the valve is in a closed position. Passing valves can be caused by human error (e.g., not closing a valve completely) and/or due to degradation or damage to the valve. Leakages caused by passing valves can be costly for the environment, operator health, and business profitability.

For example, unintentional passing of gases to a flare system in oil and gas plants is a common issue that can result in significant business losses and environmental hazards. Gases that are produced during the oil and gas production processes are often burned off in the flare system to reduce the amount of gas that is released into the atmosphere. However, when the gases are not meant to be burned, passing valves can result in a significant loss of valuable resources. In addition to business losses, unintentionally passing gases in the flaring system can also pose environmental hazards. The gases that escape into the atmosphere can contribute to air pollution, negatively impacting human health, wildlife, and the environment.

SUMMARY

This disclosure describes systems and methods for detecting passing valves. A data processing system (e.g., a computing system that includes one or more processors) receives vibration data from a sensor coupled to a pipe at a position near a valve. The data processing system generates a spectrogram representing a variation of the frequencies in the vibration data over time. The data processing system detects a passing valve by classifying the spectrogram using a trained convolutional neural network (CNN).

In one aspect, a method for detecting passing valve includes measuring vibrational data with a sensor coupled to a pipe adjacent to a valve; generating a spectrogram representing a time variation of frequencies of the vibrational data; detecting that the valve is a passing valve by classifying the spectrogram as including frequencies representative of a passing valve, the classifying being based on a trained convolutional neural network; and in response to detecting the passing valve, performing a corrective action to resolve the passing valve.

In one aspect, a system for detecting passing valves includes a piezoelectric sensor coupled to a pipe adjacent a valve; at least one processor and a memory storing instructions that, when executed by the at least one processor, cause the at least one processor to perform operations including measuring vibrational data with a sensor coupled to a pipe adjacent to a valve; generating a spectrogram representing a time variation of frequencies of the vibrational data; detecting that the valve is a passing valve by classifying the spectrogram as including frequencies representative of a passing valve, the classifying being based on a trained convolutional neural network; and in response to detecting the passing valve, performing a corrective action to resolve the passing valve.

In one aspect, one or more non-transitory machine-readable storage devices storing instructions for detecting passing valves, the instructions being executable by one or more processors, to cause performance of operations including measuring vibrational data with a sensor coupled to a pipe adjacent to a valve; generating a spectrogram representing a time variation of frequencies of the vibrational data; detecting that the valve is a passing valve by classifying the spectrogram as including frequencies representative of a passing valve, the classifying being based on a trained convolutional neural network; and in response to detecting the passing valve, performing a corrective action to resolve the passing valve.

Implementations of these aspects can include one or more of the following features.

In some implementations, the corrective action includes generating an alert indicating the detection of the passing valve.

In some implementations, the corrective action includes automatically closing a valve upstream of the detected passing valve.

In some implementations, the sensor includes an analog piezoelectric vibrational sensor.

In some implementations, generating a spectrogram includes filtering the vibrational data using a bandpass filter; and converting the filtered vibrational data to digital vibrational data using a high-sampling rate analog to digital converter.

In some implementations, the sampling rate of the analog to digital converter is at least 500 KHz.

In some implementations, the bandpass filter passes frequencies between 20 kHz and 500 KHz.

In some implementations, the convolutional neural network is trained based on data acquired from a testing device, the data including spectrograms associated with multiple valve types and multiple pipe diameters.

In some implementations, the multiple valve types include gate valves, ball valves, and globe valves.

In some implementations, these aspects further include acquiring, from a testing device, training data comprising spectrograms associated with multiple valve types and multiple pipe diameters; and generating the trained convolutional neural network by training a convolutional neural network based on the training data.

Implementations of the systems and methods of this disclosure can provide various technical benefits. The CNN architecture can be implemented on edge computing devices for detecting passing valves. The data processing system can be integrated with one or more sensors providing on-the-edge detection of passing valves at a location near the passing valve without transmitting or uploading the data to a cloud or network server. Additionally, the data processing system can detect passing valves based on frequencies greater than the human audible range. Further, the data processing system can detect passing valves with a device external to the pipe, independent of pressure sensors or flow sensors, and without intruding into the pipe. The data processing system can also detect passing valves automatically to enable early mitigation of the passing valves. The data processing system can automatically classify the spectrograms using the trained CNN instead of relying on manual feature engineering to classify the spectrograms.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE DRAWINGS

Like reference symbols in the various drawings indicate like elements.

DETAILED DESCRIPTION

Passing valves (e.g., closed valves that do not completely block the passage of fluids) can occur, for example, in the energy industry such as in oil and gas plants where an abundance of pipes and valves are used. Passing valve can be caused by human error (e.g., not fully closing the valve) and/or by a fault within the valve (e.g., degradation of valve components or damage to the valve). Leakages caused by passing valves can be costly for the environment, operator health, and business finances. For example, oil or gas leaks can contaminate the environment by releasing greenhouse gasses, cause injury or disease to employees, and waste sellable assets.

This disclosure describes systems and methods for detecting passing valves. A small sensing device (e.g., a piezoelectric sensor) can be placed on or near the valve to collect high frequency vibration (e.g., acoustic) data. A data processing system (e.g., a computing system and/or a processor) generates a spectrogram representing time variation of frequency content of the vibration data collected by the sensing device. The data processing system detects passing valves based on a trained machine learning model used to classify the spectrogram.

Figure 1:
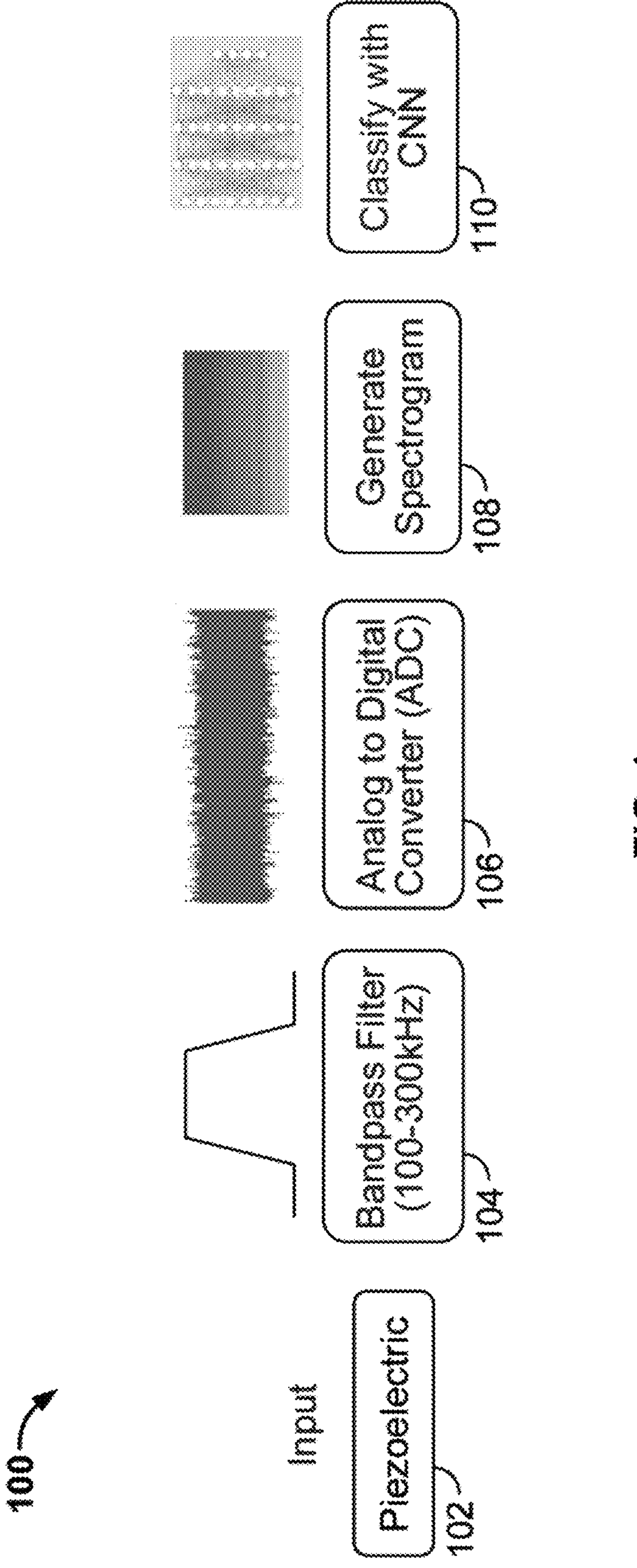
FIG. 1 illustrates a workflow for detecting passing valves, according to some implementations of the present disclosure.

FIG. 1 illustrates a workflow 100 for detecting passing valves. The workflow 100 can be implemented on a data processing system such as a computer or control system. In some examples, the workflow 100 is implemented on one or more processors included in a vibration sensor attached to a pipe, thereby enabling the workflow to be executed on-the-edge (e.g., near the point of data collection). In other examples, the data processing system is separate from the vibration sensor.

At step 102, the workflow includes receiving vibrational data from a sensor. The sensor can be a piezoelectric sensor with integrated electronics to measure the vibrations and process the measured data without communicating with a computing system external to the sensor and its associated electronics. The sensor can be coupled to a pipe near a valve of interest. For example, the sensor can be attached to a pipe with magnets at a location on the downstream side of a valve. Magnetically attaching the sensor to the pipe can enhance the vibration readings by reducing measurements of ambient noise. The sensor can be sensitive to vibrations including acoustic emissions from the valve. In implementations having non-magnetic pipes, the sensor can be coupled to the pipe through other means such as clamps, bolts, and/or zip-ties. The sensor can be communicatively coupled with other computing devices to transmit and receive data such as passing valve detection alerts and sensor status.

At step 104, the workflow 100 includes applying a bandpass filter to the vibrational data. The bandpass filter attenuates frequencies outside of a specified band to isolate frequencies indicative of passing valves (e.g., 50-500 kilo Hertz (KHz), 100-300 kHz, 20-500 kHz). The lower frequency limit can be specified, for example, to attenuate anticipated low frequency noise such as noise from vibrations or sounds caused by operating machinery or sounds in the human audible range. The upper limit of the frequency range can be selected, for example, based on the sampling frequency of the sensor or a multiple of a known peak frequency.

In some implementations, the sensor is an analog sensor, and the bandpass filter is an analog bandpass filter applied before digitization of the signal from the sensor. In some implementations, the bandpass filter is applied by the data processing system after the signal has been converted from an analog signal to a digital signal.

At step 106, the workflow 100 includes converting an analog signal from the sensor to a digital signal using a high-sampling rate analog to digital converter (ADC). The sampling rate of the ADC can be sufficiently high to satisfy the Nyquist criterion based on an anticipated maximum frequency to be measured. For example, many types of fluids leaking past many types of passing valves generate frequencies around 150 kHz. In this example, a sampling rate of at least 300 kHz can be used to detect the 150 KHz frequency. Higher sampling rates (e.g., 500 kHz or more, 1 MHz or more. 2 MHz or more) can be used to further resolve the desired frequencies. In contrast, closed valves (e.g., not passing) generate uniform frequency spectra in the frequency range of 20-500 KHz.

At step 108, the workflow 100 includes generating a spectrogram based on the digitized vibrational data. A spectrogram can represent time variation of the frequency content of a measured signal. For example, a spectrogram can be a two-dimensional image with the vertical axis representing frequency, the horizontal axis representing time and the image grayscale intensity or color values of the pixels in the image can represent the amplitude of the measured signal at the corresponding frequency and time. Including the time variation can decrease the effects of noise on the signal since external noise can be a shorter duration than the signal length. The external noise would therefore not affect each time step of the vibrational data and the spectrogram. Including the time variation of the signal can give the model more discriminatory power as compared with a power spectral density without time variation.

In some implementations, the data processing system generates spectrograms based on a 100 millisecond (ms) sample of vibrational data. The data processing system can generate the spectrograms by apply a sliding window of Fast Fourier Transforms (FFTs). The length of each window can be, for example, 256 samples and there can be an overlap, e.g., 50% overlap, between windows. The length of each window and the overlap between windows are parameters that can be tuned to generate spectrograms with desired frequency resolution and/or desired time resolution. For example, increasing the number of samples per window can increase the frequency resolution in the spectrogram while decreasing the temporal resolution. The temporal resolution can be increased or decreased by changing the window overlap, e.g., a larger overlap will increase the temporal resolution and a smaller overlap will decrease the temporal resolution.

Figure 2:
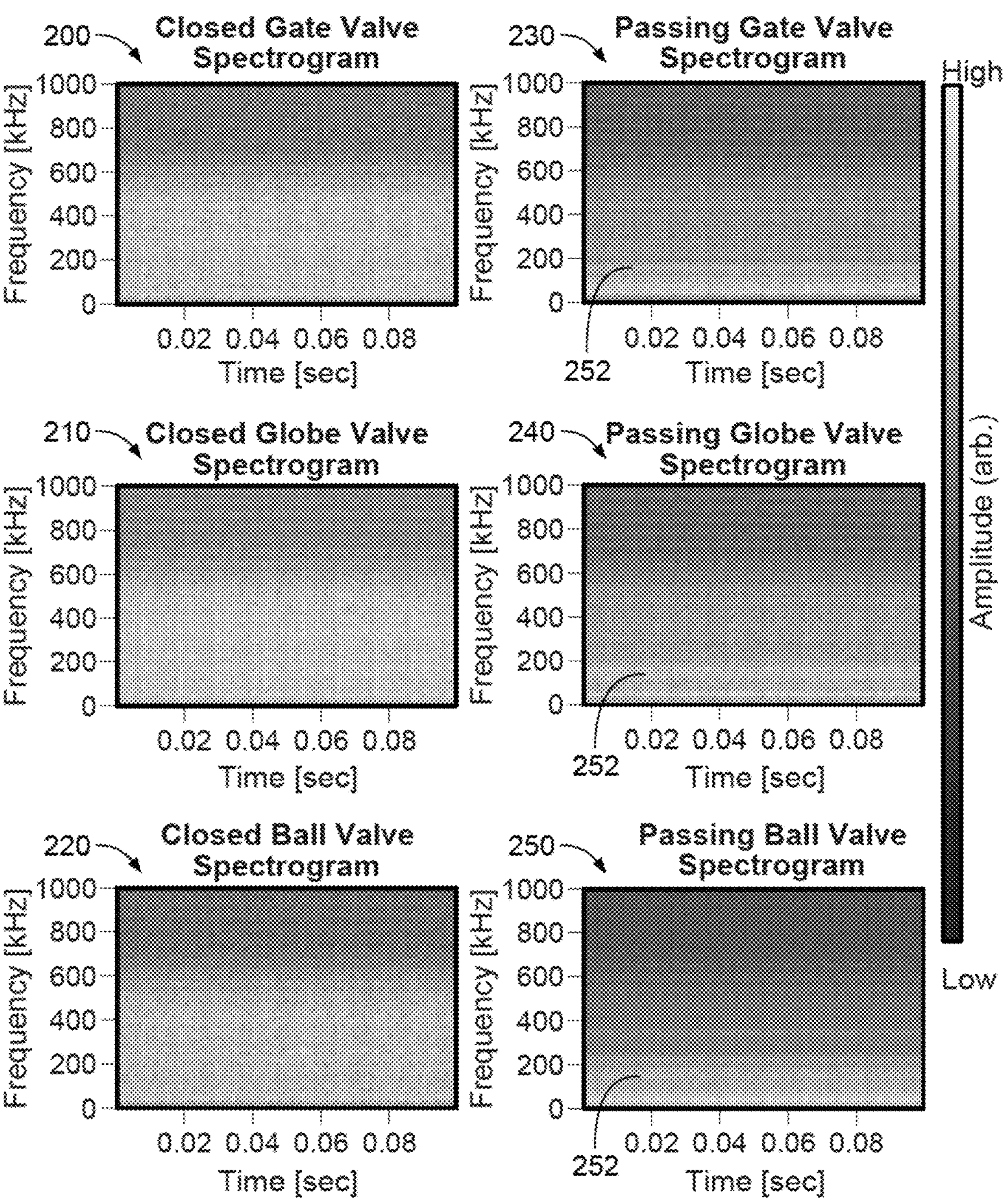
FIG. 2 is a composite plot of spectrograms representing closed valves and passing valves, according to some implementations of the present disclosure.

FIG. 2 shows a composite plot of example spectrograms 200-250 generated based on data collected by a piezoelectric vibration sensor. The collected data was filtered with a 20-500 kHz bandpass filter. Spectrograms 200-220 were collected near a closed gate valve 200, a closed globe valve 210, and a closed ball valve 230. In these spectrograms 200-220, frequencies within the bandpass filter range show a uniform high intensity while frequencies outside the bandpass filter range show lower intensity values. Spectrograms 230-250 were collected near a passing gate valve 230, a passing globe valve 240, and a passing ball valve 250. In the spectrograms 230-250, there are patterns of high intensity at discrete frequencies within the bandpass frequency range. Notably an approximately 150 KHz frequency peak 252 is seen in each spectrogram 230-250 collected near a passing valve.

Turning back to FIG. 1, at step 110, the workflow 100 includes classifying the generated spectrogram based on a trained convolutional neural network (CNN). Training data for the convolutional neural network can be collected from a testing device having multiple valve types and pipe diameters, which will be described in more detail in reference to FIG. 5. The CNN processes the spectrogram as a two-dimensional image and outputs a binary classification (e.g., 0) for a closed valve and 1 for a passing valve).

In some implementations, the output of the CNN can be a probability of the valve being a passing valve (e.g., by including a softmax or sigmoid activation function in the output layer of the CNN). The probability output by the CNN can also be used to determine a health of a valve. For example, a low probability (e.g., less than 10%, less than 20%, less than 30%) can indicate a healthy valve. A moderately low probability (e.g., between 10% and 50%, between 10% and 50%, between 20% and 60%, between 30% and 70%) can indicate a deteriorating valve. Higher probabilities (e.g., greater than 50%, greater than 60%, greater than 70%) can indicate the valve is failing (e.g., passing fluids).

Figure 3:
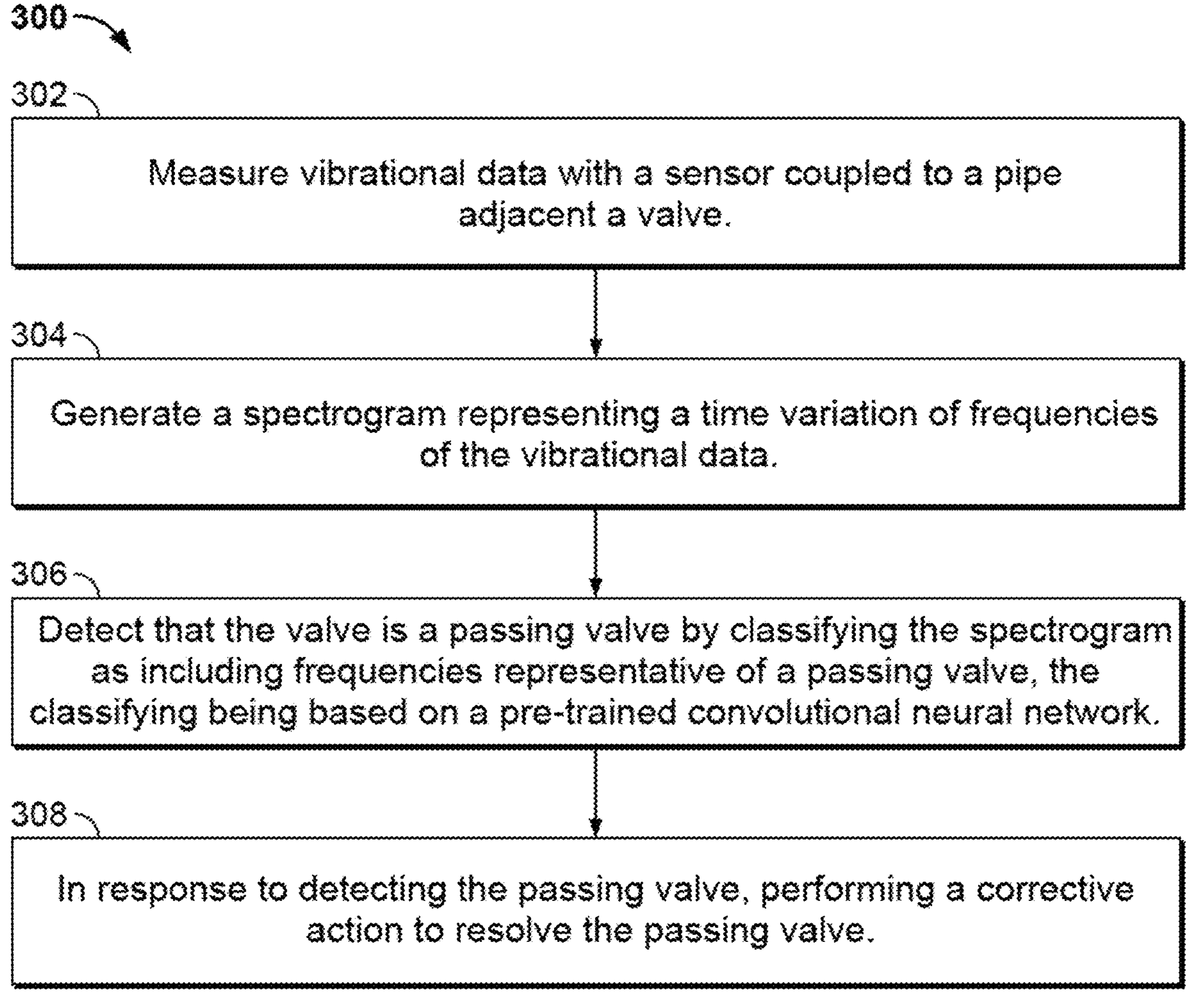
FIG. 3 is a flowchart of an example method for detecting passing valves, according to some implementations of the present disclosure.

FIG. 3 is a flow chart of an example method 300 for detecting passing valves. The method 300 is generally described in the context of the other figures in this description. For example, the method 300 can be performed by the computing system 700 shown in FIG. 7. However, the method 300 may be performed by any suitable system, environment, software, and hardware, as appropriate. In some implementations, the method 300 can be run in parallel, in combination, in loops, or in any order.

At step 302, a data processing system measures vibrational data with a sensor coupled to a pipe adjacent a valve. In some implementations, the data processing system accesses vibrational data from a data store.

At step 304, the data processing system generates a spectrogram representing a time variation of frequencies of the vibrational data.

At step 306, the data processing system detects that the valve is a passing valve by classifying the spectrogram as including frequencies representative of a passing valve, the classifying being based on a pretrained convolutional neural network.

At step 308, the data processing system performs a corrective action to resolve the passing valve in response to detecting the passing valve. In some implementations, the data processing system performs a corrective action including generating an alert indicating the detection of the passing valve. For example, the data processing system can generate an audible alert and/or a visual alert at the location of the passing valve. Alternatively, or additionally, the data processing system can transmit a signal to a computing device (e.g., a mobile device) that includes a display device to display an alert indicating that a passing valve was detected.

In some implementations, the data processing system performs a corrective action including automatically closing a valve upstream of the detected passing valve. For example, the data processing system can generate a control signal to electronically close a valve located upstream of the detected passing valve to prevent leaks through the passing valve.

Figure 4:
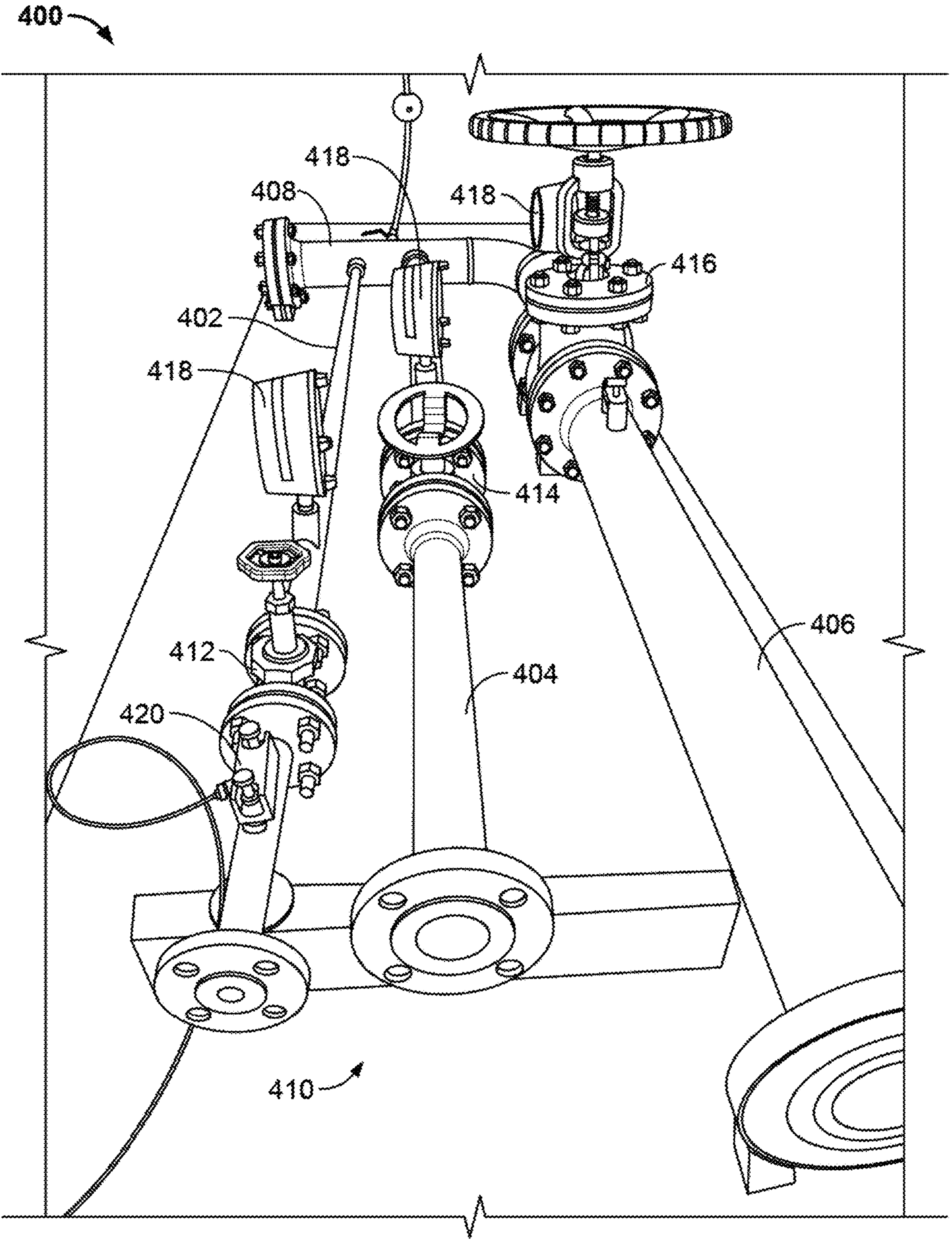
FIG. 4 is a schematic illustration of an example testing device for generating training data to train a machine learning model, according to some implementations of the present disclosure.

FIG. 4 is a schematic illustration of an example testing device 400 for generating training data to train the CNN. The testing device 400 includes 3 pipes 402-406 having different diameters. The pipes 402-406 are connected to a manifold 408 on the upstream end of the pipes. The manifold 408 is configured to distribute fluid into each pipe 402-406. The downstream ends 410 of the pipes 402-406 are open to the ambient atmosphere. The smallest diameter pipe 402 includes a gate valve 412. The medium diameter pipe 404 includes a ball valve 414. The largest diameter pipe 406 includes a globe valve 416. Each pipe 402-406 also includes a pressure sensor 418.

As shown in FIG. 4, a piezoelectric vibration sensor 420 is magnetically attached to the pipe 402 downstream of and adjacent to the gate valve 412. The piezoelectric vibration sensor 420 can also be magnetically attached to pipes 404 and 406 downstream of the valves 414 and 416.

The testing device 400 is operated by selecting one of the valves 412-416 for testing. The piezoelectric vibration sensor 420 is attached to the pipe near the selected valve. The valve is configured in a chosen configuration. For example, the valve can be fully closed, partially open, or fully open. A flow of fluid is provided to the manifold 408. The fluid can be a gas (e.g., air) or a liquid (e.g., water).

A data processing system (e.g., data processing system 700) acquires training data from the testing device 400 by collecting vibrational data from the piezoelectric sensor 420 while fluid is being provided to the manifold 408. The data processing system generates spectrograms (similar to the spectrograms shown in FIG. 2) based on the collected vibrational data. The training data includes the spectrograms labeled with a 0 for valves in a fully closed configuration (e.g., not passing or leaking) and labeled with a 1 for valves in a passing configuration (e.g., partially or fully open). Other labeling schemes are also possible. Spectrograms are generated based on data collected from each of the valves in a variety of configurations. Including training data collected from multiple pipe diameters and multiple valve types and configurations helps prevent overfitting the CNN to a particular pipe size or valve type.

The data processing system trains the CNN based on the acquired training data. The training data can be divided between a training set and a test set. For example, the training set can include data collected from ball valves and gate valves and the test set can include data from globe valves. The training data can be divided between the training set and the test set in other ways also. For example, the training set and the test set can be selected randomly from the training data according to a specified ratio (e.g., 70/30 training/testing split). The data processing system optimizes the CNN weights based on the training set. The data processing system evaluates the CNN performance based on the test set.

In two example implementations, two CNN models were trained based on VGG16 and ResNet50 models implemented in Python via the PyTorch framework. Both models were trained on data collected from the testing device 400 with air flowing through the pipes. Both trained CNN models performed with 100% accuracy on the test set correctly classifying passing valves and non-passing valves. Further testing of the trained CNN models was performed using data collected from the testing device 400 and not included in the test nor training sets with water and air flowing through the pipes. The CNN classified the data with high accuracy in real-time.

Real-time or near real-time processing refers to a scenario in which received data (e.g., spectrograms) are processed as made available to systems and devices requesting those data immediately (e.g., within milliseconds, tens of milliseconds, or hundreds of milliseconds) after the processing of those data are completed, without introducing data persistence or store-then-forward actions. In this context, a real-time data processing system is configured to process spectrogram data as quickly as possible (though processing latency may occur). Though data can be buffered between module interfaces in a pipelined architecture, each individual module operates on the most recent data available to it. The overall result is a workflow that, in a real-time context, receives a data stream (e.g., spectrograms) and outputs processed data (e.g., classification of the spectrograms) based on that data stream in a first-in, first out manner. However, non-real-time contexts are also possible, in which data are stored (either in memory or persistently) for processing at a later time. In this context, modules of the data processing system do not necessarily operate on the most recent data available.

Figures 5A, 5B, 5C:
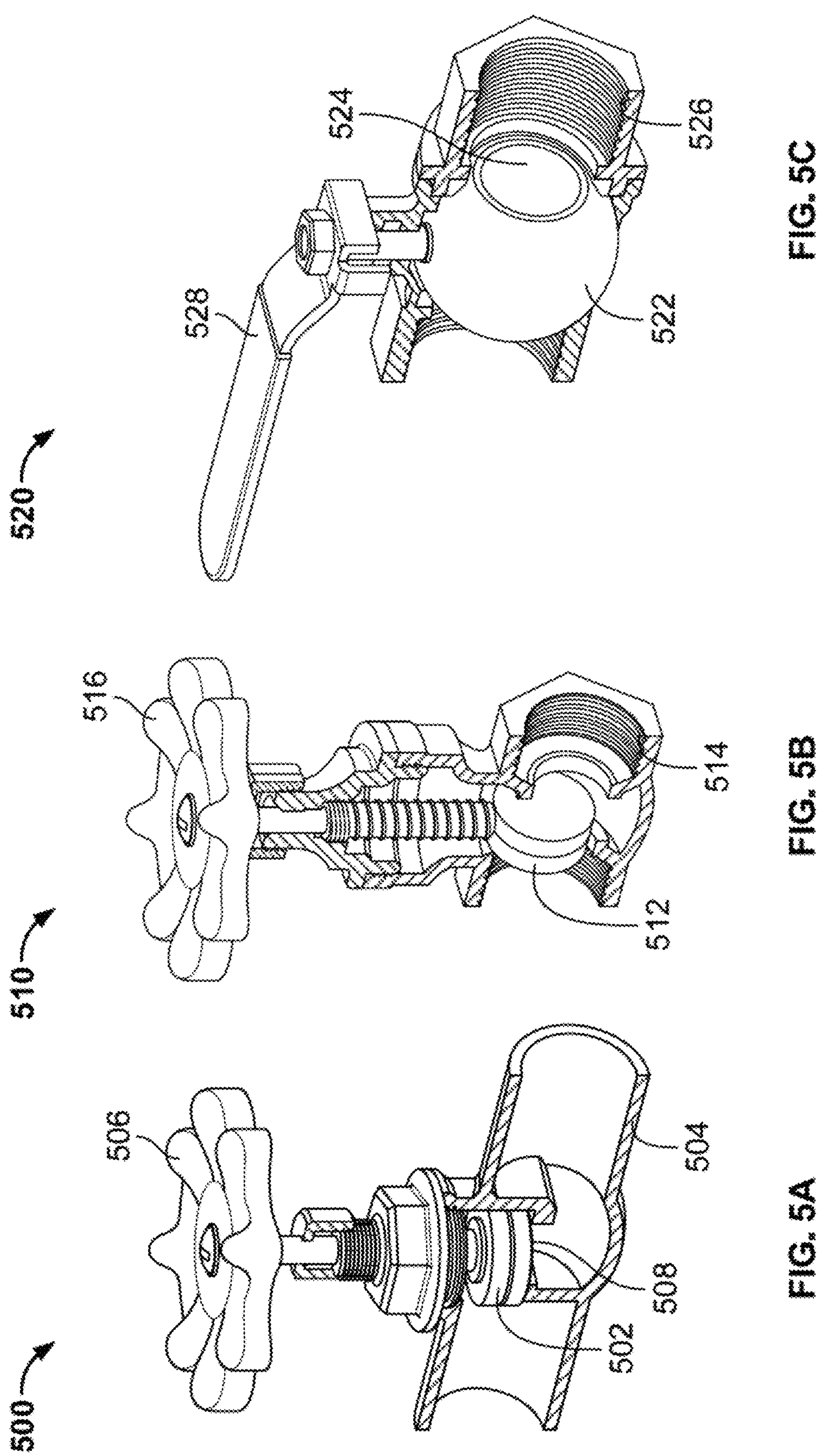
FIGS. 5A, SB. 5C illustrate various valve types for which passing valves can be detected, according to some implementations of the present disclosure.

FIGS. 5A-5C show partial cross section illustrations of example valves 500, 510, and 520. The globe valve 500 includes a plug 502 that can be translated perpendicularly to a longitudinal axis of the pipe 504 by turning the handle 506. The plug 502 blocks an orifice 508 to prevent fluid flow through the pipe 504 when the globe valve 500 is in a fully closed position. The gate valve 510 includes a gate 512 that is perpendicular to the longitudinal axis of the pipe 514. The gate 512 is translated perpendicularly to the longitudinal axis of the pipe by rotating the handle 516. The gate 512 blocks the flow of fluid through the pipe 514 when in a fully closed position. The ball valve 520 includes a ball 522 with a hole 524 bored through the ball 522. The ball 522 can be rotated about an axis perpendicular to a longitudinal axis of the pipe 526. The ball valve 520 can be closed or opened by a quarter turn of the handle 528.

Figure 6:
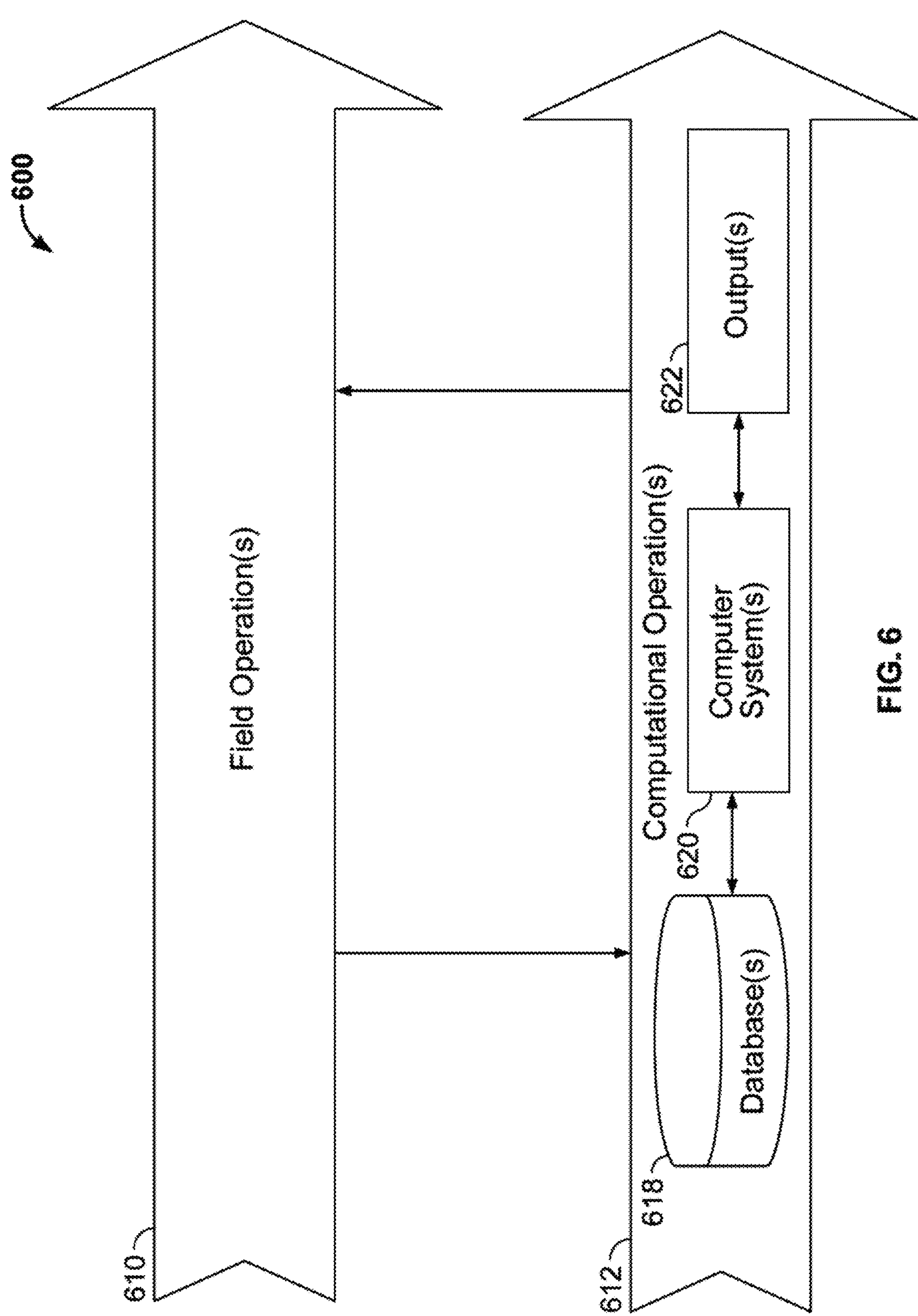
FIG. 6 illustrates hydrocarbon production operations that include field operations and computational operations, according to some implementations.

FIG. 6 illustrates hydrocarbon production operations 600 that include both one or more field operations 610 and one or more computational operations 612, which exchange information and control exploration for the production of hydrocarbons. In some implementations, outputs of techniques of the present disclosure (e.g., the method 300) can be performed before, during, or in combination with the hydrocarbon production operations 600, specifically, for example, either as field operations 610 or computational operations 612, or both.

Examples of field operations 610 include forming/drilling a wellbore, hydraulic fracturing, producing through the wellbore, injecting fluids (such as water) through the wellbore, to name a few. In some implementations, methods of the present disclosure can trigger or control the field operations 610. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 610 and responsively triggering the field operations 610 including, for example, generating plans and signals that provide feedback to and control physical components of the field operations 610. Alternatively, or in addition, the field operations 610 can trigger the methods of the present disclosure. For example, implementing physical components (including, for example, hardware, such as sensors) deployed in the field operations 610 can generate plans and signals that can be provided as input or feedback (or both) to the methods of the present disclosure.

Examples of computational operations 612 include one or more computer systems 620 that include one or more processors and computer-readable media (e.g., non-transitory computer-readable media) operatively coupled to the one or more processors to execute computer operations to perform the methods of the present disclosure. The computational operations 612 can be implemented using one or more databases 618, which store data received from the field operations 610 and/or generated internally within the computational operations 612 (e.g., by implementing the methods of the present disclosure) or both. For example, the one or more computer systems 620 process inputs from the field operations 610 to assess conditions in the physical world, the outputs of which are stored in the databases 618. For example, seismic sensors of the field operations 610 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 612 where they are stored in the databases 618 and analyzed by the one or more computer systems 620.

In some implementations, one or more outputs 622 generated by the one or more computer systems 620 can be provided as feedback/input to the field operations 610 (either as direct input or stored in the databases 618). The field operations 610 can use the feedback/input to control physical components used to perform the field operations 610 in the real world.

For example, the computational operations 612 can process the seismic data to generate three-dimensional (3D) maps of the subsurface formation. The computational operations 612 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 612 to process new information about the formation and control the drilling to adjust to the observed conditions in real-time.

The one or more computer systems 620 can update the 3D maps of the subsurface formation as information from one exploration well is received and the computational operations 612 can adjust the location of the next exploration well based on the updated 3D maps. Similarly, the data received from production operations can be used by the computational operations 612 to control components of the production operations. For example, production well and pipeline data can be analyzed to predict slugging in pipelines leading to a refinery and the computational operations 612 can control machine operated valves upstream of the refinery to reduce the likelihood of plant disruptions that run the risk of taking the plant offline.

In some implementations of the computational operations 612, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart or are located in different countries or other jurisdictions.

Figure 7:
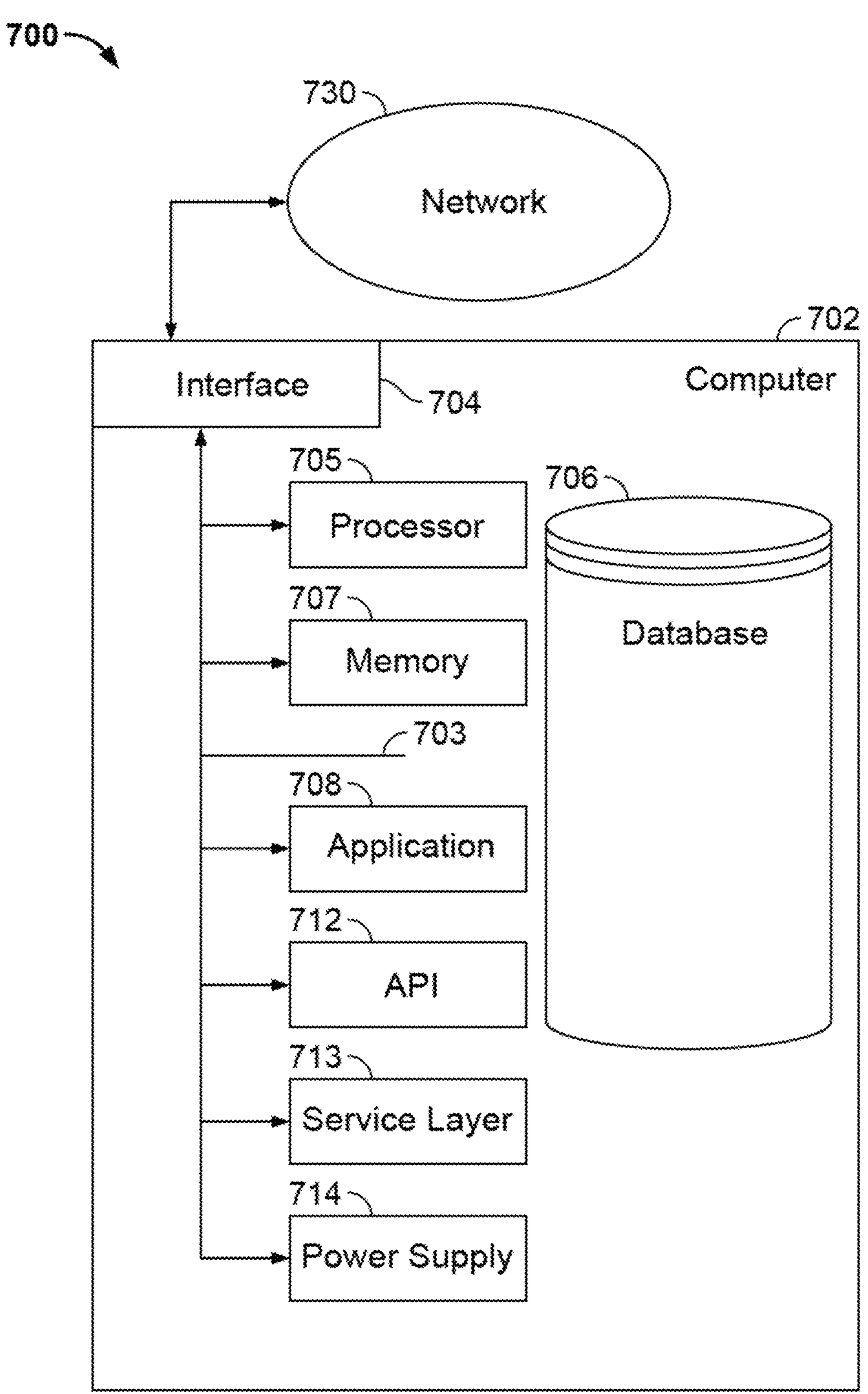
FIG. 7 is a block diagram illustrating an example computer system used to provide computational functionalities associated with described algorithms, methods, functions, processes, flows, and procedures according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus." "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for detecting passing valves, the method comprising:

measuring vibrational data with a sensor coupled to a pipe adjacent to a valve;

generating a spectrogram representing a time variation of frequencies of the vibrational data, the spectrogram being an image having a first axis representing frequency, a second axis representing time, and values of pixels in the image representing amplitudes of the vibrational data at the respective frequency and time;

detecting that the valve is a passing valve by classifying the spectrogram as including frequencies representative of a passing valve, the classifying being based on a trained convolutional neural network, the convolutional neural network receiving the spectrogram as an input and generating a binary classification of the spectrogram as an output; and in response to detecting the passing valve, performing a corrective action to resolve the passing valve.

2. The method of claim 1, wherein the corrective action comprises generating an alert indicating the detection of the passing valve.

3. The method of claim 1, wherein the corrective action comprises automatically closing a valve upstream of the detected passing valve.

4. The method of claim 1, wherein the sensor comprises an analog piezoelectric vibrational sensor.

5. The method of claim 1, wherein generating a spectrogram comprises:

filtering the vibrational data using a bandpass filter; and converting the filtered vibrational data to digital vibrational data using a high-sampling rate analog to digital converter.

6. The method of claim 5, wherein the sampling rate of the analog to digital converter is at least 500 kHz.

7. The method of claim 5, wherein the bandpass filter passes frequencies between 20 kHz and 500 kHz.

8. The method of claim 1, wherein the convolutional neural network is trained based on data acquired from a testing device, the data comprising spectrograms associated with multiple valve types and multiple pipe diameters.

9. The method of claim 8, wherein the multiple valve types comprise gate valves, ball valves, and globe valves.

10. The method of claim 1, further comprising:

acquiring, from a testing device, training data comprising spectrograms associated with multiple valve types and multiple pipe diameters; and generating the trained convolutional neural network by training a convolutional neural network based on the training data.

11. A system for detecting passing valves, the system comprising:

a piezoelectric sensor coupled to a pipe adjacent to a valve;

at least one processor and a memory storing instructions that, when executed by the at least one processor, cause the at least one processor to perform operations comprising:

measuring vibrational data with a sensor coupled to a pipe adjacent to a valve;

generating a spectrogram representing a time variation of frequencies of the vibrational data, the spectrogram being an image having a first axis representing frequency, a second axis representing time, and values of pixels in the image representing amplitudes of the vibrational data at the respective frequency and time;

detecting that the valve is a passing valve by classifying the spectrogram as including frequencies representative of a passing valve, the classifying being based on a trained convolutional neural network, the convolutional neural network receiving the spectrogram as an input and generating a binary classification of the spectrogram as an output; and in response to detecting the passing valve, performing a corrective action to resolve the passing valve.

12. The system of claim 11, wherein the corrective action comprises generating an alert indicating the detection of the passing valve.

13. The system of claim 11, wherein generating a spectrogram comprises:

filtering the vibrational data using a bandpass filter; and converting the filtered vibrational data to digital vibrational data using a high-sampling rate analog to digital converter.

14. The system of claim 11, wherein the convolutional neural network is trained based on data acquired from a testing device, the data comprising spectrograms associated with multiple valve types and multiple pipe diameters.

15. The system of claim 11, wherein the operations further comprise:

acquiring, from a testing device, training data comprising spectrograms associated with multiple valve types and multiple pipe diameters.

16. The system of claim 15, generating the trained convolutional neural network by training a convolutional neural network based on the training data.

17. One or more non-transitory machine-readable storage devices storing instructions for detecting passing valves, the instructions being executable by one or more processors, to cause performance of operations comprising:

measuring vibrational data with a sensor coupled to a pipe adjacent to a valve;

generating a spectrogram representing a time variation of frequencies of the vibrational data, the spectrogram being an image having a first axis representing frequency, a second axis representing time, and values of pixels in the image representing amplitudes of the vibrational data at the respective frequency and time;

detecting that the valve is a passing valve by classifying the spectrogram as including frequencies representative of a passing valve, the classifying being based on a trained convolutional neural network, the convolutional neural network receiving the spectrogram as an input and generating a binary classification of the spectrogram as an output; and in response to detecting the passing valve, performing a corrective action to resolve the passing valve.

18. The non-transitory machine-readable storage devices of claim 17, wherein generating a spectrogram comprises filtering the vibrational data using a bandpass filter; and converting the filtered vibrational data to digital vibrational data using a high-sampling rate analog to digital converter.

19. The non-transitory machine-readable storage devices of claim 17, wherein the convolutional neural network is trained based on data acquired from a testing device, the data comprising spectrograms associated with multiple valve types and multiple pipe diameters.

20. The non-transitory machine-readable storage devices of claim 17, wherein the operations further comprise:

acquiring, from a testing device, training data comprising spectrograms associated with multiple valve types and multiple pipe diameters; and generating the trained convolutional neural network by training a convolutional neural network based on the training data.

* * * * *